(12) United States Patent
Yang et al.

(10) Patent No.: US 6,980,785 B1
(45) Date of Patent: Dec. 27, 2005

(54) DIRECT CONVERSION WIRELESS RECEIVER WITH DIGITAL PHASE EQUALIZATION

(75) Inventors: Hong Kui Yang, San Diego, CA (US); Mark Davis, Carlsbad, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 392 days.

(21) Appl. No.: 10/033,642

(22) Filed: Jan. 3, 2002

(51) Int. Cl.[7] .................................. H04B 1/10

(52) U.S. Cl. ............. 455/304; 455/307; 329/318; 329/320

(58) Field of Search ............... 455/323, 324, 455/296, 575.1, 550.1, 63.1, 114.2, 295, 302, 455/303, 307, 337, 304, 306, 67.11, 422.1, 455/423, 424, 425, 426, 530.1, 432.1, 436, 455/442, 456.5, 456.6, 561, 525, 67.13, 135, 455/161.3, 293, 277.2, 312, 334, 339; 375/345, 375/346, 97, 261, 349, 350, 222, 348, 231; 370/335, 342, 441, 282, 345, 346, 206, 333, 370/516, 517, 312, 343, 510; 329/304, 349, 329/318, 320, 302, 306, 350–351

(56) References Cited

U.S. PATENT DOCUMENTS

| | | | | |
|---|---|---|---|---|
| 5,828,955 A | * | 10/1998 | Lipowski et al. | 455/324 |
| 5,896,306 A | * | 4/1999 | Aschwanden | 708/300 |
| 2002/0123319 A1 | * | 9/2002 | Peterzell | 455/296 |
| 2003/0214926 A1 | * | 11/2003 | Choi et al. | 370/335 |

* cited by examiner

*Primary Examiner*—Edward F. Urban
*Assistant Examiner*—Charles Chow
(74) *Attorney, Agent, or Firm*—Preston Gates & Ellis LLP

(57) ABSTRACT

A direct conversion receiver (DCR) with a pair of quadrature conversion paths. Each of the quadrature conversion paths receives an RF input signal and converts the RF input signal to a digital baseband signal. The quadrature conversion paths each include a mixer mixes the RF input signal with a carrier phase signal. Quadrature baseband signals from the mixer pass through an analog filter which provides a filtered baseband signal. An analog to digital converter (ADC) converts the quadrature baseband component to a digital baseband signal. A $5^{th}$ order elliptical filter filters the quadrature baseband component. The $5^{th}$ order elliptical filter may be before or after the ADC. A digital baseband component from the ADC and filtered by the $5^{th}$ order elliptical filter passes to a phase equalizer which compensates for phase distortion from the analog filter. The quadrature digital baseband outputs from the quadrature conversion paths are passed to a baseband processor.

11 Claims, 1 Drawing Sheet

DIRECT CONVERSION WIRELESS RECEIVER WITH DIGITAL PHASE EQUALIZATION

CROSS REFERENCE TO RELATED APPLICATION

The present invention is related to U.S. patent application Ser. No. 10/033,799 entitled "CDMA WIRELESS COMMUNICATIONS SYSTEM INCLUDING FINITE IMPULSE RESPONSE FILTER AND PHASE EQUALIZER FOR INTER-CHIP INTERFERENCE REDUCTION" to Hong Kui Yang; filed concurrently herewith and assigned to the assignee of the present invention.

BACKGROUND OF THE INVENTION

1. Field of the Invention

The present invention is related to spread spectrum wireless receivers and more particularly, to signal extraction circuits for code division multiple access (CDMA) receivers such as cellular telephones.

2. Background Description

Cellular telephones (cell phones) communicate using what is known as code division multiple access (CDMA) protocol. Call information is encoded with a unique pseudo-random code, also called pseudo-noise (PN). The encoded information modulates a carrier signal that is amplified and transmitted between network stations, e.g., between a base station or Radio Carrier Station (RCS) and one or more cell phones or Fixed Subscriber Units (FSU). Each unique pseudo random code has high auto correlation and low cross-correlation with other PNs. Thus, a receiver can use the same PN with which a signal is encoded to extract the signal from a band of signals and reject the rest, each of which is based on a different PN code.

However, very often the source of the signal being extracted from the band is much weaker than other signals in the same band or in adjacent bands, such that the others interfere ("interferers") with the signal. In fact, interferer strength may be as much as 60 dB or more above the signal. Accordingly, a good CDMA receiver must reject the interferers before it can extract the signal. A typical state of the art super-heterodyne radio frequency (RF) receiver includes an intermediate frequency (IF) stage with a surface acoustic wave (SAW) filter that rejects adjacent interferers, often by more than 35 dB. Usually, baseband signal processing rejects any remaining interferer signals. The IF filter achieves acceptable phase linearity and satisfactory performance at the expense of higher cost and complexity.

A simpler, lower cost approach, a direct conversion receiver (DCR), however, does not contain an IF stage. Instead, a DCR converts the RF input signal directly to a baseband signal. DCRs use additional analog baseband rejection to compensate for the omission of the IF filter. Unfortunately, this omission results in DCR analog baseband rejection that fails short of filtering comparable to a SAW filter. Also, DCR analog baseband filters have much poorer phase linearity, which somewhat undermines the advantages of using an inexpensive or less expensive DCR. Consequently, adding an analog phase equalizer is one approach to linearizing the phase response of the DCR analog baseband.

Unfortunately, besides consuming additional power, analog phase equalization is sensitive to component variations from temperature changes, aging, etc. So, while phase equalization has some advantages, it still may not solve the DCR phase linearity problem because the added phase equalizer would still exhibit phase response variations from component and ambient conditions that are inherent in any analog circuit. Also, because analog phase equalizers normally have fixed transfer function coefficients, an analog phase equalizer cannot be changed or adapted to compensate for these variations.

Thus, there is a need for a DCR with phase linearity and performance comparable to that achieved from an IF stage in a traditional super-heterodyne receiver.

SUMMARY OF THE INVENTION

It is a purpose of the invention to improve direct conversion receiver phase linearity and performance.

The present invention is a direct conversion receiver (DCR) with a pair of quadrature conversion paths. Each of the quadrature conversion paths receives an RF input signal and converts the RF input signal to a digital baseband signal. The quadrature conversion paths each include a mixer combines the RF input signal with a carrier phase signal. Quadrature baseband signals from the mixer pass through an analog filter which provides a filtered baseband signal. An analog to digital converter (ADC) converts the quadrature baseband component to a digital baseband signal. A $5^{th}$ order elliptical filter filters the quadrature baseband component. The $5^{th}$ order elliptical filter may be before or after the ADC. A digital baseband component from the ADC and filtered by the $5^{th}$ order elliptical filter passes to a phase equalizer which compensates for phase variations from the analog filter. The quadrature digital baseband outputs from the quadrature conversion paths are passed to a baseband processor.

BRIEF DESCRIPTION OF THE DRAWINGS

The present invention is illustrated by way of example and not limitation the accompanying figures in which like references indicate similar elements and which.

DESCRIPTION OF PREFERRED EMBODIMENTS

Figure 1:
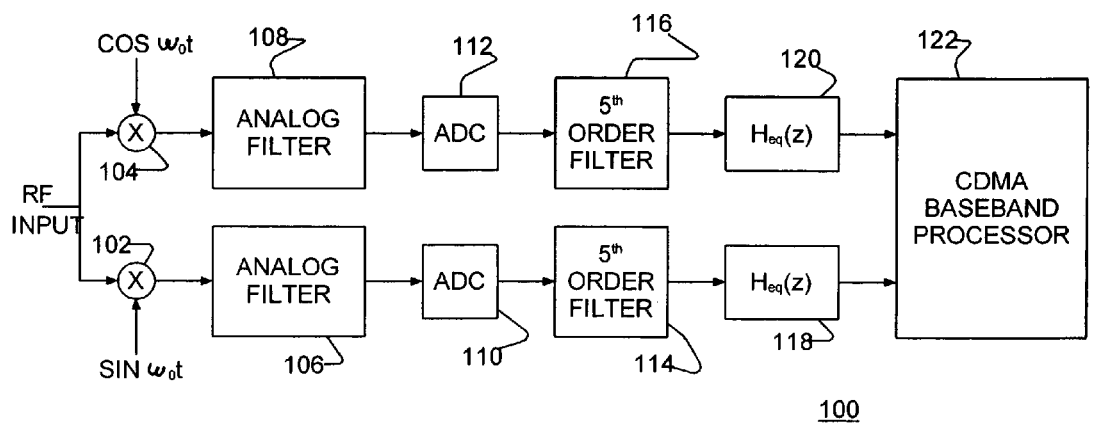
FIG. 1 is a block diagram of a first preferred embodiment direct conversion receiver (DCR)

Turning now to the drawings and, more particularly, FIG. 1 is a block diagram of a first preferred embodiment direct conversion receiver (DCR) 100 according to the present invention. According to the present invention, quadrature components are extracted from a radio frequency (RF) input signal, for example from a CDMA RF transmission. The quadrature baseband components are filtered in parallel and the filtered outputs are passed to a baseband processor for subsequent processing and data extraction.

In this embodiment RF carrier ($\omega_0$) phase signals (sin ($\omega_o t$) and cos ($\omega_o t$)) are mixed with an RF input signal at mixers 102, 104 to generate sum and difference (baseband) signal quadrature components, i.e., a real and an imaginary signal component. The sum and difference quadrature components are passed to analog filters 106, 108, which block the sum component and removes a large portion of interferers. The output of each of analog filters 106, 108 is passed to a corresponding analog to digital converter (ADC) 110, 112, each of which generates a digital output signal. The digital output from each of the ADCs 110, 112 is passed to a corresponding $5^{th}$ order elliptical digital filter 114, 116. The output of each of digital filters 114, 116 is passed to a corresponding phase equalizer 118, 120 which compensates for any phase distortion introduced by analog filters 106, 108. The output of each of the phase equalizers 118, 120 is provided to a typical CDMA baseband processor 122 for decoding and any other necessary signal handling and processing.

So, the RF input signal mixes with carrier phases in mixers 102, 104 to generate quadrature sum and baseband signals. The quadrature baseband signals are passed through inexpensive analog filters 106, 108, e.g., a filter with pass band variation less than +/−10%. For example, the analog filters 106, 108 may have a nominal passband of 670 KHz, stop band frequency of 830 KHz and provide a 38 dB rejection at 900 KHz and beyond. Typical state of the art ADCs 110, 114 convert the filtered quadrature baseband signals to digital quadrature signals, preferably, 9–10 bits. In this embodiment, the digital quadrature baseband signals from ADCs 110, 112 are passed to $5^{th}$ order elliptic digital filters 114, 116. Preferably, the $5^{th}$ order elliptic digital filters 114, 116 are selected to have a phase response matched to the basestation transmitter phase equalizer, such as is described in U.S. patent application Ser. No. 10/033,799 entitled "Inter-Chip Interference Reduction For CDMA Wireless Communications" to Hong Kui Yang, filed concurrently herewith, assigned to the assignee or the present invention and incorporated by reference. The filtered result from the $5^{th}$ order elliptical digital filters 114, 116 passes to phase equalizers 118, 120. Normally, for prior art direct conversion filters, phase distortion from the inexpensive analog filter 106, 108 would be unacceptable. However, the phase equalizers 118, 120 compensate for the analog filter distortion for this embodiment to filter out the additional passband phase distortion. Preferably, each of the phase equalizers 118, 120 are a second order all pass digital phase equalizer with a transfer function ($H_{eq}(z)$) defined by $$H_{eq}(z) = \frac{b_0 + b_1 z^{-1} + b_2 z^{-2}}{a_0 + a_1 z^{-1} + a_2 z^{-2}}$$

where a0=b2, a1=b1, a2=b0.

Figure 2:
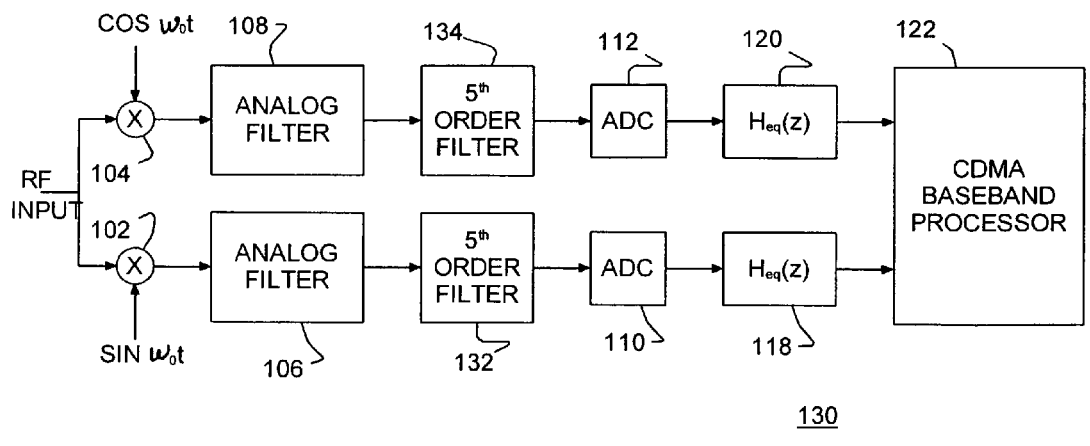
FIG. 2 is a block diagram of a second preferred embodiment direct conversion receiver (DCR).

FIG. 2 is a block diagram of a second preferred embodiment DCR 130 according to the present invention. The second preferred embodiment DCR 130 is substantially identical to the first preferred embodiment 100 of FIG. 1 with identical elements labeled identically. In this embodiment, the $5^{th}$ order elliptical filters 132, 134 are second analog filters filtering the analog baseband output of the first analog filters 106, 108. The outputs of $5^{th}$ order elliptical filters 132, 134 are provided to four (4) bit ADCs 110, 112. Because analog $5^{th}$ order elliptic filters are used in this embodiment, 4 bit ADCs 110, 112 are adequate. In this embodiment, the digital outputs of the ADCs 110, 112 are passed directly to the phase equalizers 118, 120. Thus, substantially the same digital baseband signals are provided to the phase equalizers 118, 120 in both embodiments.

$H_{eq}(Z)$ may be selected, for example, using a typical state of the art engineering analysis program, such as Matlab from The Mathworks Inc. to generate multiplierless coefficients at 8 times the chip frequency ($8f_c$), such as for example:
a=[256, −441, 194];
b=[194, −441, 256];
which provides acceptable system performance regardless of analog filter 106, 108 variation of ±10% of the passband with signal to noise ratio (SNR) degradation ≦0.1 dB.

Accordingly, using the preferred embodiment direct conversion receivers are simpler to implement than comparable prior art approaches. Regardless of whether the $5^{th}$ order elliptical filters are placed before the ADCs 110, 112 as in the second embodiment of FIG. 2 or before the ADCs 110, 112 as in the first embodiment of FIG. 1, substantially the same signal is provided to each of the phase equalizers 118, 120. The phase equalizers 118, 120 respond to phase distortion that may originate in the analog filters 106, 108 compensating for any such distortion, thereby providing improved signal quality.

Digital baseband equalization compensates phase distortion otherwise introduced by the analog components in the signal path. Further, the digital phase equalizer may be controllably adapted, e.g., with a computer, to compensate signal variations, especially phase distortion arising in the analog filter and, because the phase equalizer is digital, it is not subject to other component common variations. Thus, the present invention provides consistent selectivity and high quality results that are maintainable to within ±10% of the passband with SNR degradation ≦0.1 dB, regardless of distortion that might arise from temperature changes, component aging, etc. Interferers are rejected so that a true signal may be extracted, amplified and decoded accurately for improved reception. Thus, the present invention is more cost effective CDMA DCR than prior art approaches.

While the invention has been described in terms of preferred embodiments, those skilled in the art will recognize that the invention can be practiced with modification within the spirit and scope of the appended claims.

What is claimed is:

1. A direct conversion receiver (DCR) comprising:
a pair of quadrature conversion paths, each of said quadrature conversion paths receiving an RF input signal and converting said RF input signal to a digital baseband signal, said each quadrature conversion path comprising:
a mixer mixing said RF input signal with a carrier phase signal,
an analog filter receiving a quadrature baseband signal from said multiplier and providing a filtered baseband signal,
an analog-to-digital converter (ADC) converting a quadrature baseband component to a digital baseband signal,
a $5^{th}$ order elliptical filter filtering said quadrature baseband component, and
a phase equalizer compensating for phase distortion arising in said analog filter; and
a baseband processor receiving quadrature digital baseband outputs from said pair of quadrature conversion paths and providing digital information therefrom.

2. A DCR as in claim 1 wherein each phase equalizer is a second order all pass digital phase equalizer.

3. A DCR as in claim 2 wherein the phase equalizer has a transfer function defined by $$H_{eq}(z) = \frac{b_0 + b_1 z^{-1} + b_2 z^{-2}}{a_0 + a_1 z^{-1} + a_2 z^{-2}}$$

where a0=b2, a1=b1, a2=b0.

4. A DCR as in claim 3 wherein each $5^{th}$ order elliptical filter receives the digital output of the ADC and provides said digital baseband component to the phase equalizer.

5. A direct conversion receiver (DCR) comprising:
a pair of quadrature conversion paths, each of said quadrature conversion paths receiving an RF input signal and converting said RF input signal to a digital baseband signal, said each quadrature conversion path comprising:
a mixer mixing said RF input signal with a carrier phase signal,
an analog filter receiving a quadrature baseband signal from said multiplier and providing a filtered baseband signal,
an analog-to-digital converter (ADC) converting a quadrature baseband component to a digital baseband signal,
a $5^{th}$ order elliptical digital filter receiving said quadrature baseband component and providing a filtered digital baseband component, and
a phase equalizer compensating said filtered digital baseband component for phase distortion arising in said analog filter, and
a baseband processor receiving quadrature digital baseband outputs from said pair of quadrature conversion paths and providing digital information therefrom.

6. A DCR as in claim 5 wherein each phase equalizer is a second order all pass digital phase equalizer.

7. A DCR as in claim 6 wherein the phase equalizer has a transfer function defined by $$H_{eq}(z) = \frac{b_0 + b_1 z^{-1} + b_2 z^{-2}}{a_0 + a_1 z^{-1} + a_2 z^{-2}}$$

where a0=b2, a1=b1, a2=b0.

8. A direct conversion receiver (DCR) comprising:
a pair of quadrature conversion paths, each of said quadrature conversion paths receiving an RF input signal and converting said RF input signal to a digital baseband signal, said each quadrature conversion path comprising:
a mixer mixing said RF input signal with a carrier phase signal,
an analog filter receiving a quadrature baseband signal from said multiplier and providing a filtered baseband signal,
a $5^{th}$ order elliptical filter filtering said filtered baseband signal and providing a quadrature baseband component,
an analog-to-digital converter (ADC) converting said quadrature baseband component to a digital baseband signal, and
a phase equalizer compensating said digital baseband signal for phase distortion arising in said analog filter; and
a baseband processor receiving quadrature digital baseband outputs from said pair of quadrature conversion paths and providing digital information therefrom.

9. A DCR as in claim 8 wherein each phase equalizer is a second order all pass digital phase equalizer.

10. A DCR as in claim 9 wherein the phase equalizer has a transfer function defined by $$H_{eq}(z) = \frac{b_0 + b_1 z^{-1} + b_2 z^{-2}}{a_0 + a_1 z^{-1} + a_2 z^{-2}}$$

where a0=b2, a1=b1, a2=b0.

11. A DCR as in claim 10 wherein the phase equalizer has a transfer function defined by $$H_{eq}(z) = \frac{b_0 + b_1 z^{-1} + b_2 z^{-2}}{a_0 + a_1 z^{-1} + a_2 z^{-2}}$$

where a0=b2, a1=b1, a2=b0.

* * * * *